United States Patent [19]

Stall et al.

[11] Patent Number: 4,818,551
[45] Date of Patent: Apr. 4, 1989

[54] METHOD OF MAKING A LIQUID SMOKE IMPREGNATED SHIRRED CASING STICK

[75] Inventors: Alan D. Stall, Naperville; Keith A. Watts, Elmhurst, both of Ill.

[73] Assignee: Viskase Corporation, Chicago, Ill.

[21] Appl. No.: 183,214

[22] Filed: Apr. 19, 1988

Related U.S. Application Data

[62] Division of Ser. No. 893,514, Aug. 5, 1986.

[51] Int. Cl.$^4$ .............................................. A22C 13/02
[52] U.S. Cl. ..................... 426/420; 17/1 R; 17/49; 426/135; 426/138; 426/534
[58] Field of Search ............... 426/420, 105, 135, 138, 426/315, 413, 534; 17/1 R, 42, 49; 138/118.1

[56] References Cited

U.S. PATENT DOCUMENTS

| | | | |
|---|---|---|---|
| 1,616,971 | 8/1926 | Henderson | 17/49 |
| 1,876,279 | 8/1930 | Dietrich | 17/42 |
| 1,993,480 | 6/1934 | Hewitt | 17/49 |
| 2,984,574 | 10/1958 | Matecki | 17/42 |
| 3,209,398 | 10/1965 | Ziolko | 17/42 |
| 3,451,827 | 6/1969 | Bridgeford | 426/420 |
| 3,454,981 | 1/1966 | Martinek | 17/42 |
| 3,798,302 | 12/1971 | Kostner et al. | 17/42 |
| 3,981,046 | 9/1976 | Chiu | 426/420 |
| 4,525,397 | 3/1981 | Chiu | 426/315 |

FOREIGN PATENT DOCUMENTS 713510  7/1965  Canada .

*Primary Examiner*—George Yeung
*Attorney, Agent, or Firm*—Roger Aceto

[57] ABSTRACT

A shirred stick composed of unreinforced casing impregnated with liquid smoke. The stick has no twist which eliminates rope and gives the stick a smooth, blemish free outer peripheral surface. The method of making the stick requires placement of the shirred stick on a dowel immediately after shirring, holding it on the dowel for a period of time sufficient for moisture to migrate uniformly throughout the stick and then removing the dowel.

6 Claims, 3 Drawing Sheets

U.S. Patent  Apr. 4, 1989  Sheet 1 of 3  4,818,551
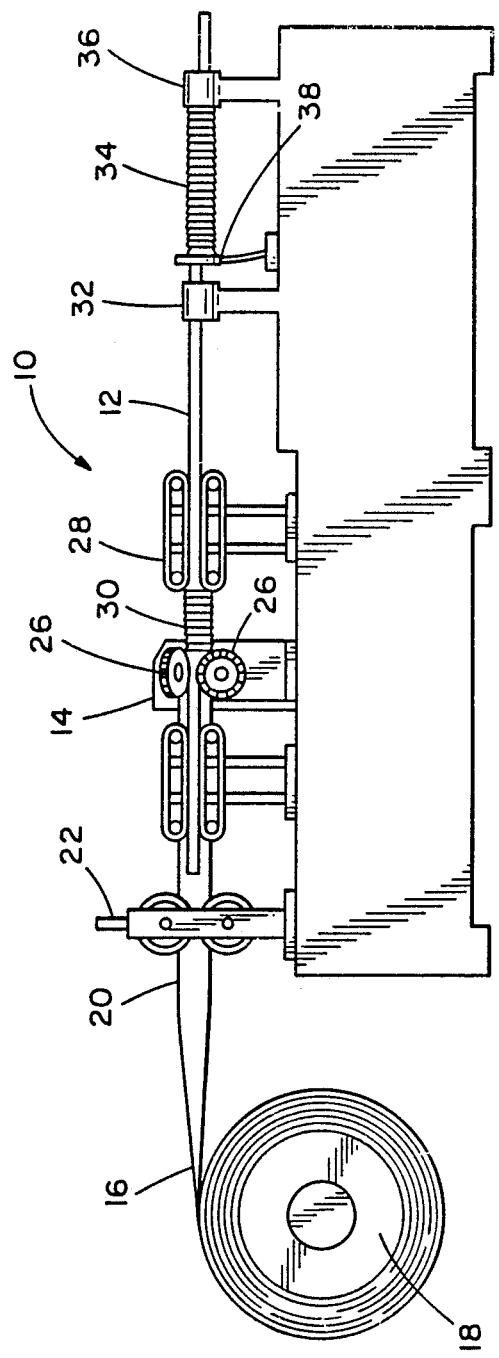
FIG.1 – PRIOR ART
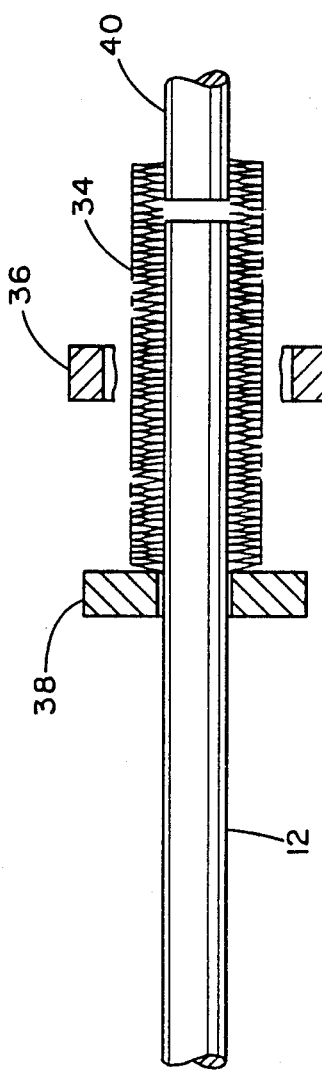
FIG.2

METHOD OF MAKING A LIQUID SMOKE IMPREGNATED SHIRRED CASING STICK

This application is a division of prior U.S. application Ser. No. 893,514, filing date, Aug. 5, 1986.

TECHNICAL FIELD

The present invention relates to a shirred casing stick and more particularly to a premoisturized shirred casing impregnated with liquid smoke or other high molecular weight additive as may be used in making flavor and color enhanced small size sausages such as frankfurters or the like.

BACKGROUND OF THE INVENTION

Shirred cellulosic casing for use in making a variety of sausage type products is well known in the art. Briefly, such casing is provided in the form of "sticks". A shirred casing stick is a hollow tube composed of a long length of casing which has been shirred and longitudinally compacted to greatly shorten its length. The reduction of casing length is defined by the ratio of the total casing length to the stick length, hereafter called "pack ratio". Thus, a one foot stick with a pack ratio of one hundred contains one hundred feet of casing. Shirring methods and apparatus are conventional and well known in the art.

A preferred embodiment of the present invention pertains to so called "small size" unreinforced cellulosic casing having an inflated diameter of about two inches and less. These small size casings are conventionally used in the production of frankfurter size sausages.

It also is known in the art to apply various coatings such as flavor enhancers or food colors to these small size casings prior to shirring. These coatings contain constituents which impregnate the casing so that after the casing is stuffed, a desirable characteristic is transferred to the food within the casing.

Such transfer may occur gradually over time or rapidly during processing, such as by cooking, so the product retains the characteristics of the additives even after the casing is removed. For example, if liquid smoke is applied to the casing, the food product within the casing will take on the fragrance, color, and taste of wood smoke without actually being subjected to a time consuming smoke house process. Liquid smoke compositions and casing articles coated with such compositions are more fully disclosed in U.S. Pat. Nos. 4,377,187; 4,446,167; 4,431,033; 4,525,397 and 4,540,613 and in Australian Pat. No. 151,768 among others.

Coating a small size casing with liquid smoke causes shirring problems. In particular, it is difficult to make a shirred stick having the desirable characteristics of a substantially straight bore, a high pack ratio, resistance to breakage, a smooth and unblemished appearance, and little or no "rope" (as defined hereinbelow). Aside from the shirring difficulties, meat packers prefer not to use shirred sticks which, based on appearance alone, appear to be defective. Accordingly, even though meat packers might benefit from using small size casing impregnated with liquid smoke, such use has been limited.

Difficulties in making a functionally and asthetically acceptable shirred stick of liquid smoke coated casing are thought to derive from the relatively high molecular weight constituents in liquid smoke and, in particular, from the liquid smoke constituents having a molecular weight greater than about 500.

These high molecular weight constituents are thought to block the interstices between the cellulose molecules and thereby impede the ability of the cellulose to take up water from the shirring solutions conventionally applied during shirring. The cellulosic structure of the casing is extremely hydrophillic. Normally, water is taken up so rapidly by the cellulose during shirring that a humectant is used to retard the uptake of water (see for example U.S. Pat. No. 3,981,046).

The water prevented from entering the interstices collects and remains at the surface of the casing. This surface water prevents a tight nesting relationship of the pleats formed during shirring and thereby lowers the resistance of the stick to breakage.

Resistance to breakage or "coherency" is important in that it is a measurement of the ability of the stick to maintain its structural and mechanical integrity so as to resist breakage when subjected to the rigors of manual handling or handling by automatic stuffing apparatus. Coherency is beam bending strength measured in inch-pounds and is derived in part from the geometry of the pleats formed by the shirring operation. These pleats are conical and nested one within another. The nested cone configuration and the surface friction of the pleats pressing one against the other are thought to contribute to the coherency of the stick.

However, if the water is prevented from entering the interstices between the cellulose molecules and instead collects and remains at the surface of the casing pleats, the cone shaped pleats are prevented from nesting tightly together. While the water at the pleat surface is eventually taken up by the casing over time, the coherency, once reduced, is only partly restored.

The wall of the cellulose casing is only about 0.001 inch thick and this thickness is not uniform about the casing circumference. It is well known in the art that this causes a shirred and subsequently longitudinally compressed stick to bow after doffing from the shirring/compressing mandrel. It also is suspected that the thinner part of the casing wall absorbs less water than the thicker parts and that this aggrevates bowing of the shirred sticks. Bowed sticks are not acceptable because they do not have a substantially straight cylindrical bore and therefore are not suited for automatic loading over a stuffing horn.

A coating of liquid smoke aggravates this problem and an uneven coating aggravates the problem still further. Depending upon the uniformity of the liquid smoke coating, one part of the casing may take up water more rapidly than another. This tends to swell the casing at different rates to produce a stick which is so excessively bowed that it is not suitable even for manual handling.

To a large extent, defects in the casing and other factors resulting in bowed sticks are negated by the known expedient of continuously twisting the stick during shirring. See for example, U.S. Pat. Nos. 3,454,981; 3,704,483. Conventional shirring, using shirring rolls of the type generally described in U.S. Pat. No. 3,461,484 gathers the casing into pleats that follow a continuous major pleat helix along the stick. Twisting the stick radially displaces one pleat from another and in this way distributes the irregularities and defects evenly about the stick so as to produce a stick which is straighter than a stick with no twist.

However, as pointed out in U.S. Pat. No. 3,454,981, twisting a stick in a conventional manner tends to produce a stick which is less coherent than a stick produced without twisting. Accordingly, twisting, which heretofore was a necessity, is not a completely acceptable solution to the problem. This is because a stick having a liquid smoke coating already has a coherency lower than a stick which does not have such a coating, and twisting the stick will lower coherency even further.

A further drawback of twisting is that the procedure magnifies any blemish in the coated casing. Harmless blemishes, such as a gradation in the color of the liqud smoke, extend longitudinally along the casing. Twisting the casing, as it is shirred, carries the blemish around the stick to produce a visible spiral or "barber pole" effect. Accordingly, an insignificant color variation which ordinarily would not be noticed, becomes most prominent when the casing is twisted. While this blemish usually will not hinder use of the casing, some meat packers will equate an imperfectly looking stick with a defective stick and will resist using it.

Another effect of twisting is a so called "rope appearance". Rope results when casing irregularities are carried around the shirring mandrel and is manifest by a wavy outer stick surface having the appearance of braided rope. The rope appearance usually does not detract from the use of the stick.

In summary, meat packers prefer to use a liquid smoke treated stick which has a uniform color and a smooth outer surface and which is free of visual blemishes. They will resist using a stick which does not have a uniform appearance and is not aesthetically pleasing even though the stick possesses the other desirable attributes of a straight bore, high pack ratio and high coherency.

Thus, an object of the invention is to provide a shirred stick of liquid smoke impregnated casing which has the desirable attributes of uniform color, a smooth outer surface free of visual blemishes, a coherency sufficient to permit handling by manual or automatic means, a substantially straight cylindrical bore so that the stick can be automatically loaded onto a stuffing horn which extends through the bore, and which has a pack ratio comparable to conventional shirred stick of clear casing.

SUMMARY OF THE INVENTION

The present invention may be characterized by a method for making a substantially straight and coherent liquid smoke impregnated hollow shirred stick comprising the steps of:

(a) shirring a length of liquid smoke impregnated unreinforced cellulosic casing about a mandrel to gather said casing length into pleats to form a shirred stick having a cylindrical bore, said shirring disposing said casing pleats in a regular pattern which follows a continuous helix along the stick wherein the pleats in the regular pattern have a period of radial displacement one from another which is less than 15° per foot of deshirred casing and, thereafter, longitudinally compacting the shirred casing;

(b) during the course of said shirring applying a water containing shirring solution to the casing in an amount sufficient to provide the casing with a moisture content of at least 16% by weight of dry cellulose;

(c) positioning a dowel in axial alignment with the mandrel, the dowel having a substantially smooth outer surface and an outside diameter of about 85% to 95% of the outside diameter of the mandrel;

(d) doffing the shirred and compacted casing onto the dowel immediately following step (a) and allowing the pleats of the shirred casing to expand inward and grip against the outer surface of the dowel;

(e) maintaining the shirred and compacted casing in place on the dowel for about 4 to 72 hours to permit absorption of the water in the shirring solution by the casing and a substantially uniform distribution of the absorbed water throughout the casing such that the shirred casing becomes substantially dimensionally stable; and thereafter (f) separating the shirred and compacted casing from the dowel.

DESCRIPTION OF THE INVENTION

The problems of the prior art, as set out above, are overcome by the present invention which is a hollow shirred casing stick composed of unreinforced small size cellulosic casing having a liquid smoke coating on the casing. The liquid smoke, applied prior to shirring, either to the outside or to the inside of the casing, is uniformly distributed along the casing and includes constituents which have molecular weights above about 500. The casing stick has sufficient coherency to permit handling by automatic stuffing apparatus, it has a regular appearance with no inherently obvious blemishes, it has a smooth outer surface, it has a substantially straight cylindrical bore, and it exhibits little or no twist or radial displacement of the casing pleats one from another.

A shirred stick of the present invention is prepared by conventional shirring and compacting techniques but without twisting the casing during shirring. In terms of the present invention, "without twist" means that the radial displacement of the casing pleats in the shirred stick is less than 15° per foot of deshirred casing.

After shirring and compacting, the casing is doffed from the shirring machine and directly onto a dowel. The dowel extends through the bore of the shirred stick and is sized to somewhat restrain inward growth of the casing pleats so that these pleats come to grip snugly about the dowel. This gripping restrains the shirred casing from expanding longitudinally and in effect maintains the shirred casing under a degree of compression for a time sufficient to permit absorption by the casing of the free water on the surface and between casing pleats. In this way the compaction of the nesting cone configuration is maintained so there is little or no loss of coherency. Also, even though the water absorption rate may vary over the length of the stick, the restraint imposed by the presence of the dowel in the stick bore prevents the stick from bowing. The dowel forces the stick to maintain a substantially straight cylindrical bore and it resists the stick tendency to bow as moisture is absorbed at uneven rates along the stick. Over time, the moisture will equilibrate by migration and will become substantially uniformly distributed throughout the stick.

As migration proceeds, the tendency of the stick to elongate or to expand inward against the dowel decreases and over time the stick will become more and more dimensionally stable. When dimensional stability has been attained, the length of the stick will not substantially change and the stick bore will remain substantially straight and cylindrical even after the dowel is removed from the stick bore.

The diameter of the dowel relative to the diameter of the shirring machine mandrel, and the time that the shirred stick is maintained on the dowel, are important aspects in the practice of the method of the present invention.

In this respect, the dowel diameter preferably should be between about 85%–95% of the diameter of the shirring machine mandrel. In this range, the dowel is not so small that it fails to restrain inward growth of the casing, and not so large that it prevents the subsequent separation of the casing from the dowel after a reasonable time without damaging the casing.

The exact diameter of the dowel relative to the mandrel diameter and the time of retention on the dowel depend upon a number of factors including, but not limited to, the inflated diameter of the casing, its wall thickness, the composition of the shirring solution, the moisture content of the casing, the pack ratio, and the nature and composition of the liquid smoke on the casing.

The length of time for maintaining the shirred stick on the dowel also depends in part on the dowel diameter relative to the mandrel size. The time should generally be between 4–72 hours. Preferably it should be between 8–24 hours with about 16 hours being most preferred. Maintaining the shirred stick on the dowels for less time increases the possibility that the water is not substantially uniformly distributed and risks bowing of the stick after separation from the dowel.

The benefits from growth restraint diminish over time so it is not necessary to maintain the shirred stick on the dowels for too long a time. Also, if the dowel is relatively large, maintaining the stick on the dowel for too long a time increases the risk that the sticks will seize about the dowels to the extent that excessive force will be required to remove the dowel. The use of excessive force to remove the dowel could result in damage to the casing.

Shirred sticks, according to the present invention, have a cylindrical bore straight enough to permit use in commercial stuffing operations employing automatic stuffing machines and exhibit a coherency generally higher than conventional liquid smoke impregnated twisted sticks.

DESCRIPTION OF THE DRAWINGS

FIG. 1 is a schematic representation of a conventional shirring machine as may be used to shirr the article of the present invention;

FIG. 2 is a view showing the doffing of the shirred casing onto a supporting dowel;

DESCRIPTION OF A PREFERRED EMBODIMENT

Figure 3:
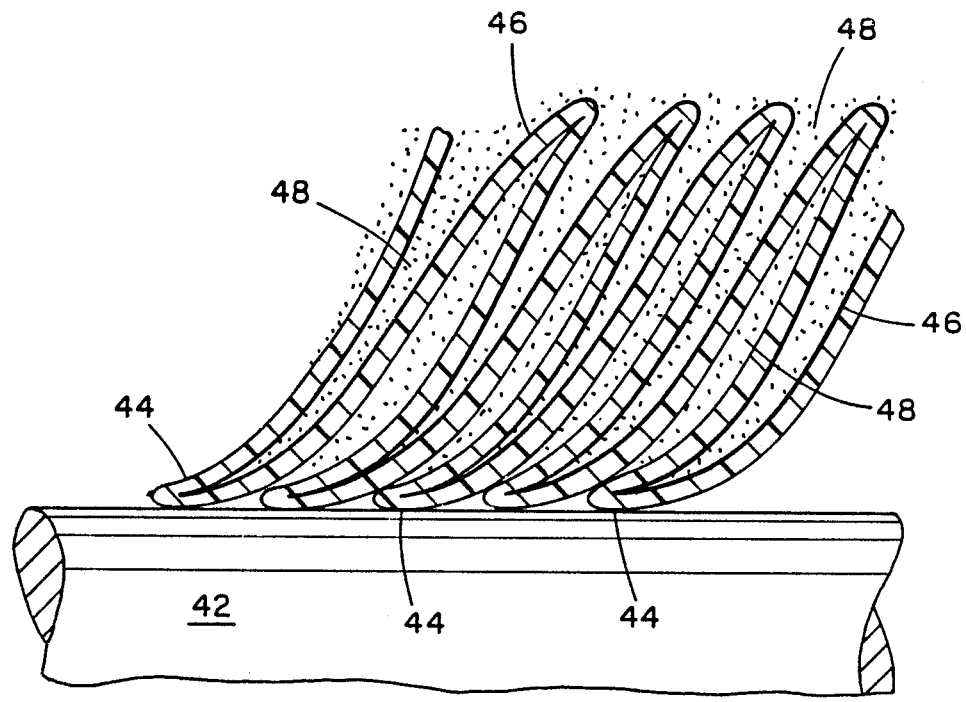
FIG. 3 is a view on an enlarged scale showing a portion of the shirred casing/dowel interface.

Referring to the drawings, FIG. 1 shows a conventional floating mandrel shirring machine commonly used in the art. The machine 10 forms no part of the present invention and is described only to illustrate one of the various types of shirring machines that can be used in the practice of the invention. The machine comprises a shirring mandrel 12 extending through a shirring head 14. As is known in the art, flattened cellulosic casing 16 from supply roll 18 is inflated. The inflated casing 20 is fed onto the mandrel by a pair of feed rolls 22.

Shirring head 14 comprises a multiplicity of shirring rolls 26, usually three in number. The inflated casing 20 passes through the shirring rolls, which shirr the casing in conjunction with hold back means schematically represented by belts 28 in a manner well known to those familiar with the art. The shirring rolls are of a type generally described in U.S. Pat. No. 3,461,484. These rolls form the shirred pleats in a regular pattern that follows a continuous helix along the stick.

The advance of the shirred casing 30 on the mandrel 12 is retarded by hold back means 28 in order to provide a substantially regular pleat formation and a partially compacted shirred casing. The shirring rolls 26 and holdback means 28 cooperate to gather the casing into generally conical pleats which nest one within another. During a subsequent compaction step, as set out hereinbelow, these nesting pleats are pressed into a tight nesting engagement.

After the initial shirring and pleating action, the casing is transferred further down the mandrel and towards a first clamp 32. First clamp 32 is opened and a shirred casing length is conveyed manually, or by any conventional or automatic means, to the position represented by shirred length 34 up against a second clamp 36. In this position the shirred length 34 is further compacted by a compactor arm 38 pressing the shirred length 34 against second clamp 36. Preferably, compaction is by a double ended simultaneous technique using two compactor arms as described in U.S. Pat. No. 4,578,842, the disclosure of which is incorporated herein by reference.

Sometime prior to being rolled into supply role 18, the cellulosic casing is coated with liquid smoke. The aforementioned U.S. Pat. Nos. 4,431,033 and 4,540,613 disclose a suitable liquid smoke composition and method for applying the smoke to the casing. Thereafter, during shirring, an appropriate and conventional shirring solution is applied to the casing by means (not shown) to facilitate shirring and to moisturize the casing. Preferably, the shirring solution contains no water penetrating inhibitor such as proplyene glycol or glycerine. The solution can be applied directly to the casing 20 or it can be applied to the shirring rolls 26 for transfer to the casing.

After shirring and compaction, clamp 36 is opened and arm 38 is operated to push the shirred and compacted casing 34 from the mandrel 12 and onto a dowel 40 which has been axially aligned with the end of the mandrel for this purpose (see FIG. 2).

Dowel 40 is slightly smaller in diameter than the diameter of a mandrel in order to facilitate the transfer of the shirred and compacted casing from the mandrel onto the dowel. Preferably the dowel should be between about 85% and 95% of the outside diameter of the mandrel. The dowel can be any round, solid or hollow rod of a suitable material such as wood, plastic or metal so long as it has a relatively smooth outer peripheral surface. A preferred material is polyurethane, polyvinyl chloride or polypropylene.

It is known that when the shirred and compacted casing is doffed from the shirring mandrel the pleats of the shirred casing, if left unrestrained, will tend to grow inwardly so as to partially occlude the bore of the hollow shirred stick. This inward growth is further accompanied by a longitudinal expansion of the casing. However, by doffing the shirred stick directly on to a dowel, as described, both the inward and longitudinal growth are restrained. In this respect, as shown in FIG. 3, the inwardly expanding pleat 44 encounter the unyielding surface 42 of a dowel and press against this surface. The difference between the outside diameter of the dowel and the outside diameter of the shirring machine mandrel is such that the expansion of the casing pleats against the dowel causes the pleats to grip snugly about the outer surface of a dowel. This gripping relationship restrains the casing from growing longitudinally and accordingly, the casing is held in a relatively tight compacted condition with only slight longitudinal growth.

As set forth hereinabove, a liquid smoke 46 which can be on the inside, the outside, or on both the inside and outside of the casing, will interfere with the rapid uptake of moisture from the shirring solution so that a quantity of shirring solution indicated at 48 becomes trapped between adjacent casing pleats.

The compacted casing is maintained on the dowel for a period of time of between about 4 hours and about 72 hours. This time allows the moisture in the shirring solution 48 to be absorbed by the cellulosic molecules. If the dowel diameter and mandrel diameter have been properly selected as set out hereinabove, the dowel can be removed from the bore of the shirred stick without damaging the casing.

Since the shirred casing is restrained from longitudinally expanding during the time the water is being absorbed, the geometry of the nested conical pleats is not substantially altered so that the resulting shirred stick article, when separated from the dowel, has a relatively high coherency. Also, the dowel resists the tendency of the stick to bow during the time it takes for the moisture to become substantially uniformly distributed throughout the stick. When the moisture is uniformly distributed, the stick becomes relatively dimensionally stable so it maintains a substantially straight cylindrical bore even after the dowel is removed.

Figure 4:
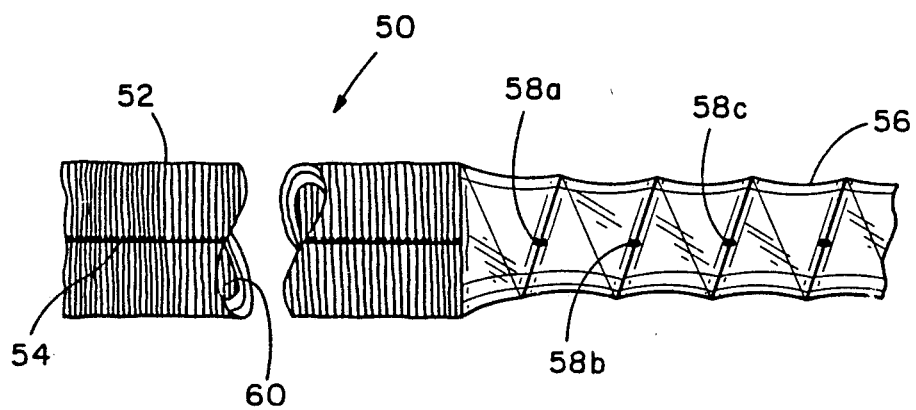
FIG. 4 is a view partly broken away and in section showing a portion of the shirred casing after separation from the dowel.

FIG. 4 illustrates a shirred casing stick after separation from the supporting dowel. The stick generally indicated at 50 has a relatively smooth and uniform outer surface 52. This is due in part to the fact that the casing, according to the present invention, is shirred without twisting or radially displacing the pleats one with respect to the other. Thus, the stick exhibits little or no radial displacement of one pleat from another in the shirred stick. A zero (0) displacement is considered to be where the locus of radial displacement of the pleats is less than 15° per foot of deshirred casing (i.e., not more than about one revolution in 25 feet of casing deshirred from the stick).

The absence of a radial twist or displacement can be demonstrated by drawing a heavy longitudinal line 54 on the shirred stick 50. When casing 56 is deshirred from the stick, the heavy line becomes a series of dots 58a, b, c etc. extending along the deshirred casing. These dots may extend straight along the deshirred casing or they may spiral around the deshirred casing either clockwise or counter clockwise. For purposes of the present invention, a zero radial displacement is where the radial displacement of the dots from a straight locus represented by line 54, either clockwise or counter clockwise, is less than 15° per foot of deshirred casing.

Conversely, if a line is drawn longitudinally along the casing prior to shirring, the line would continue onto and along the shirred stick as a substantially straight line and would not spiral around the shirred stick as shown for example in FIG. 1 of U.S. Pat. No. 3,454,981.

Since there is little or no twist, the stick has a relatively uniform appearance. This is because any longitudinal blemish is not spiraled around the stick in a barber pole effect and, therefore, is less conspicuous.

The stick 50 is substantially straight and it has a cylindrical bore 60. The bore is straight enough to permit an automatic loading of the stick over a stuffing horn. This is because the pleats of shirred casing which gripped snugly about the supporting dowel prevented the stick from bowing during the time that moisture was being absorbed by the casing. Moreover, even though the moisture may have been absorbed at different rates, the moisture, over time, becomes substantially uniformingly distributed throughout the stick. During this time, the restraint, as offered by the dowel prevented the stick from bowing while the stick length grew slightly.

To demonstrate the present invention, reel stock, comprising a conventional small size unreinforced cellulosc casing having an inflated diameter of 0.6 inch, and which was pretreated with a liquid smoke solution, was shirred on a conventional floating mandrel shirring machine. The liquid smoke coating on the casing was a concentrated tar-depleted liquid smoke prepared according to the general teachings of U.S. Pat. No. 4,540,613 the disclosure of which is incorporated herein by reference. The liquid smoke, known to contain constituents such as phenols and carbonyls that have molecular weights greater than about 500, had the following characteristics:

| | |
|---|---|
| concentration ratio | 3 |
| total acidity | 16% |
| Phenols | 6 mg/ml |
| Carbonyls | 275 mg/ml |
| Browning Index | 35 |
| light transmission (per test described in U.S. 4,496,595) | 85% |

This smoke was applied uniformly to the casing at the rate of about 9 milligrams per square inch prior to shirring. At the time of shirring the casing, it was estimated that the liquid smoke coating comprised 20%-25% of the casing based on the weight of dry cellulose in the casing.

The shirring solution, applied to the internal surface of the casing, was composed of about 94% water, 2.8% mineral oil, an emulsifier for the oil and about 2.5% carboxymethelcellulose as a peeling agent. The solution did not contain propylene glycol or glycerine which are known in the shirring art as water penetration inhibitors.

The rate of application of the shirring solution was intended to provide the casing in the shirred stick with a moisture content of about 25½%–33% based on the dry weight of cellulose in the casing. Typically, casings of this size are stuffable if they have a moisture content of about 16%-35%. The liquid smoke treated casing was shirred to produce sticks containing about 70 feet of casing. Each stick was compacted to about 10½ inches to produce a compacted pack ratio of about 80. A total of 100 sticks were made. Of this total, 50 sticks were made using a conventional twist which superimposed onto the pleat helix, a twist of about 1.33 revolutions per inch of shirred stick length. These sticks were doffed from the machine and were left unrestrained.

In accordance with the present invention, another 50 sticks were made with no superimposed twist. Of these sticks, 25 were doffed onto polyurethane dowels which were 0.396 inch in diameter, i.e., about 92% of the mandrel diameter (0.430 inch). These sticks were left on the dowels for about sixteen (16) hours and then they were removed with no difficulty and without damaging the casing.

As a control, the remaining 25 untwisted sticks were not put on dowels but were left unrestrained after doffing from the mandrel.

The control sticks (untwisted and unrestrained) bow immediately after doffing from the mandrel. After sixteen hours they were so bowed and deformed and were so low in coherency as to be useless.

The twisted sticks were relatively straight sixteen hours after shirring and, on average, they had a coherency of about 0.8–1.3 inch pounds. These sticks were considered to be suitable for manual handling or handling by automatic means in a commercial operation. However, these sticks each had a distinct barber pole effect caused by a slight gradation in the color of the liquid smoke coating on the casing. Also, these sticks had a distinct "rope" appearance.

In contrast, the sticks per the present invention had, on average, a coherency of about 2.3 to 2.5 inch pounds when removed from the dowels, i.e., sixteen hours after shirring. A coherency of this magnitude is considered to be relatively high for sticks of liquid smoke coated casing. These sticks had a relatively straight cylindrical bore comparable to the twisted sticks but were much better looking. The sticks had uniform color with no obviously objectional blemishes or gradations in color. Moreover, the outer surface of the sticks were relatively smooth and were free of any rope appearance.

A second group of shirred casing sticks were made with the same 0.60 diameter liquid smoke treated casing. The conditions were identical except that the shirring machine mandrel was 0.410 inch in diameter and the dowels used were each 0.385 inch in diameter, i.e., about 94% of the mandrel diameter. The results of the shirring were substantially the same as before. The control sticks were useless; the twisted sticks were useable but exhibited both barber pole and rope; and the sticks per the invention (which were left on the dowels for sixteen hours) had the highest coherency, the smoothest outer surface and did not readily show blemishes or gradations in smoke color.

A third group of sticks were made with the smoke impregnated casing. The length of casing in each stick was increased to about 84 feet. The shirring machine mandrel was kept at 0.410 inch and the compacted pack ratio was about 84. The dowel size was decreased to about 0.375 inch in diameter, i.e., about 91.5% of the mandrel diameter. The results were substantially the same as before in that the control sticks were extremely deformed whereas the twisted sticks, while useable, had lower coherency and were less attractive than the sticks made per the present invention and left on the dowels for sixteen hours.

Figure 5:
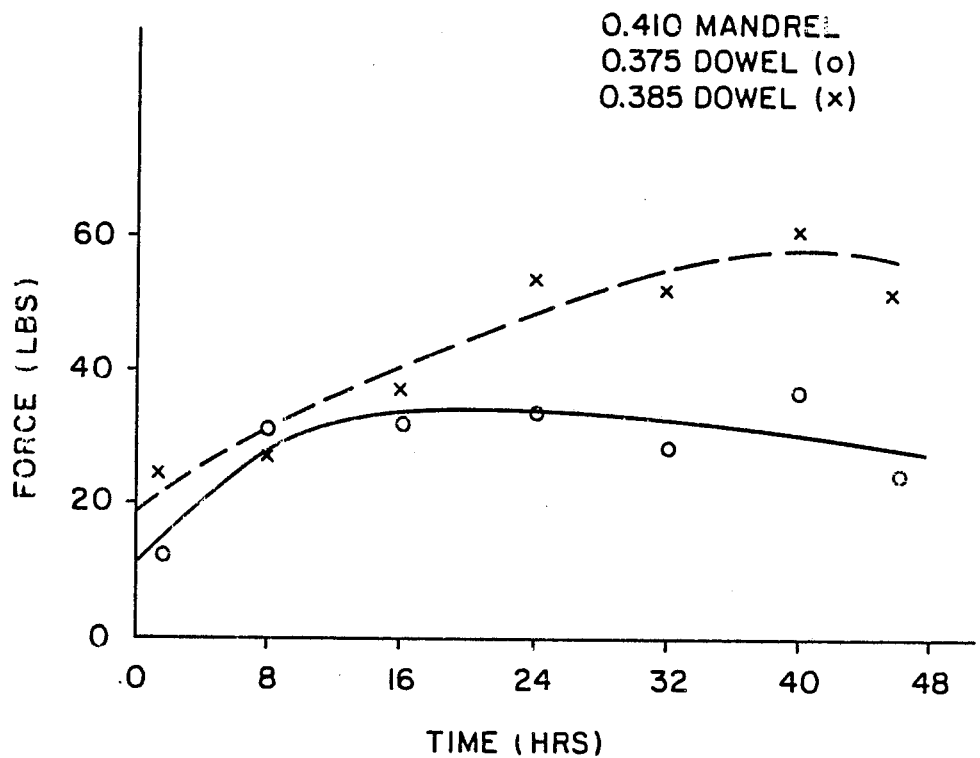
FIG. 5 is a graph showing the typical relationship of time and the force required to remove the shirred stick from the dowel.

FIG. 5 shows the force required to remove dowels from the untwisted shirred sticks over time. Sticks, each containing 70 feet of casing, were formed on a 0.410 inch mandrel. In one test the polyurethane dowels were 0.375 inch in diameter and in a second they were 0.385 inch in diameter. Thirty-five sticks were placed on dowels.

Dowels were extracted from five (5) sticks five to ten minutes after placement on the dowels (representing zero time) and at each of eight hour intervals thereafter. The average force of each set of five sticks for each size of dowel is shown in FIG. 5.

For the 0.375 inch dowel, an initial force, on average, of about one pound was required to extract the dowel. This increased to slightly over three pounds after sixteen hours and appeared to stablize around this value over the forty-eight hour period.

When the dowel size was increased to a diameter of 0.385 inch, an initial force, on average, of about two pounds was required to extract the dowel. This increased to slightly over 3.5 pounds after sixteen hours. The force required to extract the dowels continued to increase to well over five pounds after twenty-four hours and reached a peak of over six pounds after forty hours.

In another test, two groups of sticks of liquid smoke impregnated casing and two groups of sticks of clear casing (i.e., casing with no liquid smoke coating) were made about a 0.410 mandrel. One group of each type of casing was made with no twist and one group of each type of casing was made with a conventional twist. All sticks contained about seventy (70) feet of a casing (0.60 inch inflated diameter) at a compacted pack ratio of about 80. The twist rate of both groups of twisted sticks was about 1.33 revolutions per inch of stick length, i.e., about 72° of radial displacement per foot of deshirred casing.

All sticks made with no twist were doffed onto 0.375 inch diameter dowels. The dowels were removed from sticks of each group at intervals of ten minutes, one day and four days after shirring. The coherency of each group was tested immediately after removal of the dowels.

The coherency of twisted sticks was also measured after the same intervals of time and the average of all measurements are set out in Table I.

Table I shows that for the two groups of sticks composed of liquid smoke impregnated casing, the sticks of group (B) representing the sticks of the present invention had, on average, a coherency that was 53% higher than the twisted sticks of group (A) after ten minutes, 45% higher after one day, and 50% higher after four days.

For sticks of groups (C) and (D) composed of clear casing, the coherency improvement of sticks of group (D) with no twist versus the twisted sticks of group (C) over eacn of the same time intervals was only 28%, 25% and 20% respectively.

TABLE I

SMOKE AND CLEAR CASING COHERENCY OF TWIST AND NO-TWIST PRODUCT

| | 10 Min. | One Day | Four Days |
|---|---|---|---|
| Liquid Smoke | | | |
| Group (A) | 0.51 | 1.54 | 1.68 |
| Group (B) | 0.78 | 2.24 | 2.53 |
| % Improvement | 53% | 45% | 50% |
| Clear | | | |
| Group (C) | 1.2 | 3.03 | 2.99 |
| Group (D) | 1.53 | 3.79 | 3.58 |
| % Improvement | 28% | 25% | 20% |

Table I also shows that the sticks of group (B) representing the sticks of the present invention, exhibit an improvement in coherency over the twisted sticks of group (A) which is greater than the comparable improvement of the group (D) clear sticks (no twist) over the group (C) clear sticks (twisted). In particular, the liquid smoke sticks of group (B) that remained on dowels for only ten minutes had, on average, a coherency of 0.78 inch pounds. Group (B) sticks that remained on dowels for one day had, on average, a coherency of 2.24 inch pounds, i.e., an increase in coherency of 187%. After four days, the coherency increased, on average, to 2.53 inch pounds, i.e., an increase of 224% over the ten minute coherency.

For comparable clear casing sticks of group (D), made with no twist, the coherency, on average, increased from 1.53 inch pounds after ten minutes to 3.79 inch pounds after one day (a 148% increase) and to 3.58 inch pounds after four days (a 147% increase).

Thus, it should be appreciated that the present invention provides a shirred stick of liquid smoke impregnated casing which has the features and characteristics desired by the meat packer. The stick has a relatively high coherency which decreases the likelihood of breakage as the stick is transported or is handled by an automatic stuffing machine. The stick has a uniform color which does not readily show blemishes. Also, the stick has a smooth outer surface and is free of rope which detracts from the appearance of the stick.

Having thus described the invention in detail, what is claimed as new is:

1. A method of making a substantially straight and coherent liquid smoke impregnated shirred stick comprising the steps of:
   (a) shirring a length of liquid smoke impregnated, unreinforced cellulosic casing about a mandrel to gather said casing length into pleats to form a shirred stick having a cylindrical bore, said shirring disposing said casing pleats in a regular pattern which follows a continuous helix along the stick wherein the pleats in the regular pattern have a period of radial displacement one from another which is less than 15° per foot of casing deshirred from the stick and, thereafter, longitudinally compacting the shirred casing;
   (b) during the course of said shirring, applying a water containing shirring solution to the casing in an amount sufficient to provide the casing with a moisture content of at least 16% by weight of dry cellulose;
   (c) positioning a dowel in axial alignment with the shirring mandrel, the dowel having a substantially smooth outer surface and an outside diameter of about 85-95% of the outside diameter of the mandrel;
   (d) doffing the shirred and compacted casing onto the dowel immediately following step (a) and allowing the pleats of the shirred casing to expand inward and grip against the outer surface of the dowel;
   (e) maintaining the shirred and compacted casing in place on the dowel for between 4 hours and 72 hours to permit absorption of water in the shirring solution by the casing, and a substantially uniform distribution of the absorbed water throughout the casing such that the shirred casing becomes substantially dimensionally stable; and thereafter
   (f) separating the shirred and compacted casing from the dowel.

2. A method as in claim 1 wherein said shirred casing is maintained on said dowel for at least about 16 hours.

3. A method as in claim 1 wherein the diameter of the dowel is about 90% to about 94% of the mandrel diameter.

4. A method as in claim 1 wherein the liquid smoke is a tar-depleted liquid smoke which comprises about 20%-25% of the casing weight based on the weight of dry cellulose in the casing.

5. A method as in claim 1 wherein the unreinforced cellulosic casing has an inflated diameter of about 0.5 to 1.5 inches.

6. A method as in claim 1 wherein the liquid smoke comprises between 10-30% of the weight of the casing based on the weight of dry cellulose in the casing.

* * * * *